United States Patent Office 2,815,349
Patented Dec. 3, 1957

2,815,349
CERTAIN SUBSTITUTED THIOGLYOXALONES

Claude Rimington, London, Alexander Lawson, Southgate, London, Charles E. Searle, Englefield Green, and Harold Victor Morley, London, England, assignors to National Research Development Corporation, London, England, a British corporation No Drawing. Application June 22, 1956,
Serial No. 593,028

Claims priority, application Great Britain
January 18, 1956

5 Claims. (Cl. 260—309.6)

This invention comprises new anti-thyroid compounds.

It is known that 1-methyl-2-mercaptoglyoxaline is a very potent anti-thyroid agent. Its activity is much greater than that of thiouracil, the drug in most common use.

The compounds of the present invention have the formula:

$$\begin{array}{c} CH=CH \\ R'.CO.N \diagdown \diagup N.R \\ C \\ \| \\ S \end{array}$$

in which R is an alkyl, aryl or alkaryl group and R' is an alkoxy, amidoalkyl or aroxy group.

These compounds are especially valuable as relatively tasteless anti-thyroid agents of more prolonged action and at least equal potency in comparison with the known 1-methyl-2-mercapto-glyoxaline. They exhibit no evidence of toxicity.

The compounds may be produced from 2-mercaptoglyoxalines having the substituent group R on the 1-nitrogen atom, by conducting the following reaction in a basic medium such as pyridine:

$$\begin{array}{c} CH=CH \\ N \diagdown \diagup N.R \\ C \\ | \\ SH \end{array} + Cl.CO.R' \longrightarrow \begin{array}{c} CH=CH \\ R'.CO.N \diagdown \diagup N.R \\ C \\ \| \\ S \end{array}$$

The reaction is believed to pass through a stage involving an intermediate compound having the group R'.CO— attached to the sulphur instead of the 3-hydrogen, followed by spontaneous isomerization. It may indeed be conducted so as definitely to produce such an intermediate by preliminarily working in a non-basic medium.

The R-substituted 2-mercaptoglyoxalines themselves may be prepared by either of the two following known methods.

(a) by the reaction of bromoacetal under pressure with an amine, followed by ring closure with an alkali thiocyanate in acid solution or (b) by the reaction in alcoholic solution of aminoacetal with an organic isothiocyanate, followed, if necessary, by treatment of the so formed substituted thiourea with acid to effect ring closure.

The following examples are given for the purpose of illustrating the invention.

*Example 1.—Preparation of 1-methyl-3-carbethoxy-2-thioglyoxalone*

0.1 mol of 1-methyl-2-mercaptoglyoxaline is dissolved in the minimum quantity of pyridine at 0° C. 0.1 mol of ethyl chloroformate is added dropwise with stirring. More pyridine is added, if necessary, to keep the mixture semi-fluid. The sludge is then placed in an ice-box for 30 minutes. The crystals are filtered off and washed firstly with a little ethanol and secondly with ethanol and water. The non-basic desired forementioned product is crystallised from the solvent to give colourless needles having a melting point of 122–123° C.

*Example 2.—Preparation of 1-methyl-3-carbomethoxy-2-thioglyoxalone*

The procedure of Example 1 is followed but substituting methyl chloroformate for the ethyl ester. The forementioned desired product, recrystallised from ethanol, is non-basic and has a melting point of 135° C.

*Example 3.—Preparation of 1-methyl-3-carbobenzoxy-2-thioglyoxalone*

0.1 mol of 1-methyl-2-mercaptoglyoxaline is dissolved in the minimum amount of pyridine at 0° C. 0.1 mol of carbobenzoxy chloride is added dropwise with stirring. The solution is then stirred for ½–1 hour at room temperature and placed in a vacuum desiccator over concentrated $H_2SO_4$/KOH.

The sticky oil is rubbed under petroleum ether and the solvent poured off. This is repeated twice. The thick oil is then rubbed under water which causes it to crystallise slowly. The white crystalline material is filtered off. On recrystallisation from benzene/petroleum-ether (60–80° C.) the forementioned desired product is obtained in non-basic white needles having a melting point of 91–92° C.

*Example 4.—Preparation of 1-methyl-3-carbobenzoxy-2-thioglyoxalone*

0.1 mol of 1-methyl-2-mercaptoglyoxaline is dissolved in 50 ml. of 4 N caustic soda at 0° C. 0.1 mol of carbobenzoxy chloride is added slowly. After the addition the mixture is stirred at 0° C. for 15–30 minutes. The reaction mixture is then placed in an ice-box for ½ hour, the white solid filtered off and washed firstly with water and secondly with petroleum-ether. The solid is crystallized from benzene/petroleum-ether to give non-basic white needles of the forementioned desired product having a melting point of 91–92° C.

*Example 5.—Preparation of 1-methyl-3-hippuroyl-2-thioglyoxalone*

0.01 mol of 1-methyl-2-mercaptoglyoxaline is dissolved in 10 ml β-picoline at room temperature and 0.01 mol of 2-phenyloxazol-5-one added slowly. The mixture is allowed to stand at room temperature for 24 hours and is then poured into ice water with stirring. The small crystals appearing are then removed by filtration and recrystallized several times from ethyl acetate in which they are rather sparingly soluble. This gives a colourless microcrystalline product, M. P. 175° C. Found: C, 56.4; H, 4.9; N, 15.3%. $C_{13}H_{13}O_2N_3S$ requires C, 56.9; H, 4.7; N, 15.3%.

What is claimed is:

1. As a new anti-thyroid compound, a substance selected from the group consisting of 1-methyl-3-carbethoxy-2-thioglyoxalone, 1-methyl-3-carbomethoxy-2-thioglyoxalone, 1-methyl-3-carbobenzoxy-2-thioglyoxalone, and 1-methyl-3-hippuroyl-2-thioglyoxalone.

2. As a new antithyroid compound, 1-methyl-3-carbethoxy-2-thioglyoxalone.

3. As a new anti-thyroid compound, 1-methyl-3-carbomethoxy-2-thioglyoxalone.

4. As a new anti-thyroid compound, 1-methyl-3-carbobenzoxy-2-thioglyoxalone.

5. As a new anti-thyroid compound, 1-methyl-3-hippuroyl-2-thioglyoxalone.

No references cited.